(12) United States Patent
Xu et al.

(10) Patent No.: US 7,153,478 B2
(45) Date of Patent: Dec. 26, 2006

(54) DOWNFLOW CATALYTIC CRACKING REACTOR AND ITS APPLICATION

(75) Inventors: Kejia Xu, Beijing (CN); Shuandi Hou, Beijing (CN); Jun Long, Beijing (CN); Xiaoxiang Zhong, Beijing (CN); Jiushun Zhang, Beijing (CN); Zhanzhu Zhang, Beijing (CN); Songnian Li, Beijing (CN); Xuefeng Wu, Beijing (CN); Jun He, Beijing (CN)

(73) Assignees: China Petroleum & Chemical Corporation, Beijing (CN); Research Institute of Petroleum Processing Sinopec, Beijing (CN)

( * ) Notice: Subject to any disclaimer, the term of this patent is extended or adjusted under 35 U.S.C. 154(b) by 625 days.

(21) Appl. No.: 10/421,785

(22) Filed: Apr. 24, 2003

(65) Prior Publication Data

US 2004/0004025 A1  Jan. 8, 2004

(30) Foreign Application Priority Data

| Apr. 26, 2002 | (CN) | ............................. 02 1 16925 |
| Mar. 11, 2003 | (CN) | ............................. 03 1 19556 |
| Mar. 11, 2003 | (CN) | ............................. 03 1 19557 |

(51) Int. Cl.
*B01J 8/18* (2006.01)
*B32B 27/04* (2006.01)
*C10G 11/18* (2006.01)

(52) U.S. Cl. .................. 422/140; 422/141; 422/142; 422/143; 422/144; 422/145; 422/146

(58) Field of Classification Search ........... 422/139, 422/140, 141, 142, 143, 144, 145, 146
See application file for complete search history.

(56) References Cited

U.S. PATENT DOCUMENTS

| 4,385,985 A | 5/1983 | Gross et al. |
| 4,514,285 A | 4/1985 | Niccum et al. |
| 4,693,808 A | 9/1987 | Dewitz |
| 4,797,262 A * | 1/1989 | Dewitz ....................... 422/142 |
| 5,296,131 A | 3/1994 | Raterman |

(Continued)

FOREIGN PATENT DOCUMENTS

CN  1020344  4/1993

(Continued)

OTHER PUBLICATIONS

English Language Abstract of CN 1265937.

(Continued)

*Primary Examiner*—N. Bhat
(74) *Attorney, Agent, or Firm*—Scully, Scott, Murphy & Presser, PC

(57) ABSTRACT

A downflow catalytic cracking reactor, comprising the following components: catalyst delivery pipe (1), reactor top cover (2), feed nozzle (3), reactor vessel (6), downflow reaction pipe (9), the upper end of the outer body is close connected to top cover (2) along the direction of circumference; the bottom of the outer wall body is close connected to the outer wall of the downflow reaction pipe; the upper section of the downflow reaction pipe is located inside the reaction vessel, while the lower section extends from the bottom of the outer body; feed nozzle (3) is located on the top cover (2) and/or side wall of the reactor vessel (6) with the outlet of the feed nozzle being above the inlet of the downflow reaction pipe; catalyst delivery pipe (1) is fixedly joined to the reactor vessel and in communication with catalyst lifting zone (7) formed by the reaction vessel and the downflow reaction pipe.

19 Claims, 13 Drawing Sheets

U.S. PATENT DOCUMENTS

| | | | |
|---|---|---|---|
| 5,462,652 A | 10/1995 | Wegerer | |
| 5,468,369 A * | 11/1995 | Muldowney | 208/113 |
| 5,565,176 A * | 10/1996 | Johnson et al. | 422/144 |
| 5,589,139 A * | 12/1996 | Zinke et al. | 422/144 |
| 5,730,859 A * | 3/1998 | Johnson et al. | 208/78 |
| 6,534,689 B1 * | 3/2003 | Stankevitch | 585/241 |
| 2004/0124124 A1 * | 7/2004 | Pinho et al. | 208/113 |

FOREIGN PATENT DOCUMENTS

| | | |
|---|---|---|
| CN | 2205827 | 8/1995 |
| CN | 1111274 | 11/1995 |
| CN | 2214222 | 12/1995 |
| CN | 1205028 | 1/1999 |
| CN | 1265937 | 9/2000 |
| CN | 1058046 | 11/2000 |
| CN | 1275234 | 11/2000 |
| CN | 1371960 | 10/2002 |
| DE | 4216661 | 11/1993 |
| EP | 0573316 | 12/1993 |
| EP | 0952202 | 10/1999 |
| JP | 10251664 | 9/1998 |
| WO | WO 01/44406 * | 6/2001 |

OTHER PUBLICATIONS

English Language Abstract of CN 1275234.
English Language Abstract of CN 1111274.
English Language Abstract of CN 1205028.
English Language Abstract of CN 1371960.
English Language Abstract of CN 1058046.
English Language Abstract of CN 2214222.
English Language Abstract of CN 2205827.
English Language Abstract of CN 1020344.
English Language Abstract of JP 10-251664.
English Language Abstract of DE 42 16 661.
English Language Abstract of EP 0 573 316.

* cited by examiner

DOWNFLOW CATALYTIC CRACKING REACTOR AND ITS APPLICATION

FIELD OF THE INVENTION

The present invention relates to a reactor for the catalytic cracking of petroleum hydrocarbons in the absence of hydrogen, in particular, it relates to a downflow catalytic cracking reactor and its application.

DESCRIPTION OF THE PRIOR ART

Along with the development of economy, the demand in the whole world for vehicle fuels and light olefins is continually increasing. The development of deep processing of heavy oils for increasing the supply of light oils and light olefins will be a significant developing strategy of the refinery industry in $21^{st}$ century. Catalytic cracking process has the advantages of wide adaptability to the feedstock, high conversion depth of heavy oil, and high olefin content in the produced LPG, therefore it is the most important technology for the secondary processing of heavy oils. The catalytic cracking units are large in scale, and needs less investment, so they are the support for the economic benefit of all refineries in the world. The improvement of the product distribution and product selectivity of the catalytic cracking process is very important for raising the economic benefit and competitive ability of an enterprise on the market, so it is a target all refineries pursuing with great efforts.

Because the value of petrochemical products is much higher than that of refinery products, the integration of oil refining and chemical industry is an effective way for effectively utilizing resources and raising the economic benefit of refineries, and also a developing trend of the worldwide oil-refining industry nowadays. In recent years, since the demand for propylene is increasing rapidly, to increase the yield of propylene by the FCC process is paid great attention all over the world.

The yield of light olefins in the products of FCC process can be increased by using the conditions of a high temperature, a high catalyst/oil ratio and an appropriate catalyst in a riser catalytic cracking reactor. In a riser reactor, the hydrocarbon oil feedstock is hard to fully atomize and vaporize in time when sprayed into the dense catalyst bed at the bottom of the riser through the nozzle. A longer reaction time is needed to convert all the feedstock with an adequate depth and produce more light olefins. Meanwhile, there exists rather severe backmixing since the catalyst flows against the direction of gravity in the riser. In such a reaction environment, more dry gas and coke are also produced when most of the heavy oil is cracked, which will reduce the yield of the products with higher added values such as light oil and LPG.

In a downflow pipe reactor, since oil/gas and the catalyst flow along the direction of gravity in nearly a plug flow and therefore the backmixing is very little. The lowering of the backmixing extent makes the coke deposited on the catalyst decrease and therefore favors the increase in the catalyst activity and selectivity to the products with high added value. Well-known companies such as Exxon, Mobil, UOP, Stone & Webster, etc, have developed downflow reactors of their own early or late since 1980s to increase the product selectivity of the FCC or catalytic pyrolysis process and applied for a series of patents.

U.S. Pat. No. 4,514,285 discloses a catalytic cracking reaction system with a downflow pipe and a riser for the regeneration of catalyst in dilute phase. After regeneration of the catalyst in the dilute phase riser, flue gas is removed in a degassing tank to increase the density of the catalyst. Catalyst in the degassing tank enters the downflow reacting pipe through the catalyst distributor plate. The feed oil is sprayed into the downflow reaction pipe along the radial direction through nozzles from annular distributor and brought into contact with the freely falling catalyst to conduct the cracking reaction in the downflow reaction pipe. The conversion of heavy oils in this kind of downflow pipe reactor is rather low because the concentration of the catalyst is quite low when the hydrocarbon feed initially contacts the catalyst and thereby the oil/catalyst contact efficiency is not ideal.

U.S. Pat. No. 5,296,131 discloses a downflow pipe reactor. In this reactor, the regenerated catalyst flows out through the gap between the core and seat of a cone plug valve, forming an annular "curtain". The feed oil is sprayed along the radial direction onto the catalyst "curtain" from the nozzles uniformly arranged under the cone surface along the circumference and brought into contact with the catalyst in a form of cross flowing, and then enters the downflow reactor to carry out reaction. Although this downflow reactor has strengthened the mixing between the feed oil and the catalyst through the cross-flow contact, the conversion of the heavy oil is not sufficient because the hydrocarbon oil feed still contacts the free-falling catalyst, the concentration of the catalyst in this reactor is still low, and the quantity of the active center which can contact feed oil effectively is very limited.

U.S. Pat. No. 5,462,652 discloses an ultra short time contact catalytic cracking process, i.e. MSCC. In this process, the catalyst flows downwards in a form of a curtain, and the petroleum hydrocarbon is transversally sprayed onto the curtain of the catalyst. Feed oil and the catalyst horizontally penetrate the reaction zone, and carry out reaction at the same time. After the reaction, the oil/catalyst mixture is rapidly separated. A part of the stripped catalyst directly enters the catalyst mixer without regeneration and mixes with the regenerated catalyst to raise the catalyst/oil ratio. Although this process raises the concentration of the catalyst in the initial catalyst/oil contact section to a certain extent by increasing the catalyst/oil ratio, there still exists the problem of low efficiency of the catalyst/oil contact and insufficient conversion of heavy oils because the concentration of the free falling catalyst can not attain the level needed for an adequate conversion of heavy oils.

CN1265937A discloses a canular reactor wherein the downflow pipe is coaxially installed inside the riser. In this reactor, there are two schemes for the location at which hydrocarbon oil feed is sprayed into the catalyst bed. In the first scheme, the nozzles are located on the sidewall of the riser, the outlets of the nozzles are below the inlet of the downflow pipe, and the hydrocarbon oil feed is sprayed into the annular catalyst rising zone between the riser and the downflow pipe through the nozzles, brought into contact with the catalyst to carry out reaction while rising to the inlet of the downflow pipe, and then flows into the downflow pipe and reacts while concurrently flowing downwards with the catalyst. In the second scheme, the nozzles extrude into the downflow pipe and spray the hydrocarbon oil feed into the downflow pipe and bring it into contact with the free-falling catalyst. Although the first scheme can raise the catalyst concentration in the initial contact zone and thereby raise the catalyst/oil contact efficiency, the heated hydrocarbon oil would inevitably be sprayed onto the outer surface of the downflow pipe, and at the same time, there exists rather severe backmixing in the annular zone where feed oil contacts the catalyst initially, thereby leading to serious coking of heavy oils on the wall of the downflow pipe in the canular and an abnormal operation. In the second scheme, the catalyst/oil contact efficiency and the conversion of heavy oils are not high because the hydrocarbon oil is still sprayed onto and concurrently contact the free falling catalyst with low-concentration.

CN1275434A discloses a catalyst inlet device suitable for the gas-solid concurrent downflow bed reactor. The character of this reactor is that its outer shell is coaxially installed with the main body of the downflow bed reactor, the top part of the outer shell is a turbulent mixing zone of the gas-solid two phases, the inlet of the carrier gas is located on the side wall below the inlet of the downflow pipe reactor, the carrier gas blows the catalyst in the annular catalyst pre-lifting zone between the outer shell and the downflow pipe into the turbulent mixing zone of the gas-solid two phases in the top part of the outer shell, and then into the downflow reactor. The hydrocarbon oil feed is sprayed into the downflow pipe through the nozzle and contacts the catalyst in a dilute phase state. Although this catalyst inlet device enables the catalyst to be distributed more uniformly in the downflow pipe, it cannot raise the concentration of the catalyst in the downflow pipe, and therefore the oil/catalyst contact efficiency and the conversion of heavy oils are still low.

In summary, there commonly exist a series of problems in the prior arts such as low oil/catalyst contact efficiency, low conversion of heavy oils, and coking inside the reactor. So far, the report has not been seen about the downflow reactor that can properly solve the aforesaid problems and has good reaction performance.

SUMMARY OF THE INVENTION

One object of the present invention is to provide a downflow catalytic cracking reactor with high oil/catalyst contact efficiency and good reaction performance based on the prior arts.

Another object of the present invention is to provide the use of the aforesaid downflow reactor for catalytic cracking, catalytic pyrolysis, and catalytic thermal pyrolysis.

The downflow catalytic cracking reactor provided by the present invention comprises the following components: catalyst delivery pipe (1), reactor top cover (2), feed nozzle (3), reactor vessel (6), downflow reaction pipe (9), the upper end of the reactor vessel is close connected with top cover (2) along the direction of circumference; the bottom of the reactor vessel is close connected with the outer wall of the downflow reaction pipe; the upper section of the downflow reaction pipe locates inside the reactor vessel, while the lower section extends from the bottom of the reactor vessel; feed nozzle (3) locates on the top cover (2) and/or side wall of the reactor vessel (6) with the outlet of the feed nozzle being above the inlet of downflow reaction pipe; catalyst delivery pipe (1) is fixedly jointed with the reactor vessel and communicated with catalyst lifting zone (7) formed by the reactor vessel and the downflow reaction pipe.

By locating feed nozzle (3) on the top cover (2) and/or side wall of the reactor vessel (6) with the outlet of the feed nozzle being above the inlet of downflow reaction pipe, the downflow catalytic cracking reactor provided by the present invention creates advantageous conditions for the atomization of petroleum hydrocarbons, which will make the feed oil in this downflow reactor atomized more sufficiently and enhance the oil/catalyst contact efficiency, and therefore more large molecules in the heavy oil can be cracked. As a result, the yields of products with high added values such as light oil and LPG increased obviously.

Preferably, a lifting medium distributor is equipped at the bottom of said catalyst lifting zone. By means of regulating the amount of the injected lifting medium, the concentration of the catalyst bed can be controlled within a desirable range, and therefore provide sufficient active center of catalyst for cracking petroleum hydrocarbons and enhance the conversion ability for heavy oils Preferably, inner components such as orifice plates, shutter grids, or packing layers, etc are equipped in the catalyst lifting zone. These inner components or packing can break the large bubbles within the dense bed to prevent these bubbles from throwing the catalyst to the zone above the inlet of the downflow pipe when they break at the bed surface and affecting the atomization of the hydrocarbon feed. This also favors the formation of a relatively steady level surface of the catalyst, makes the catalyst enter the downflow pipe in a state of relatively stable gas-solid two phases to suppress the fluctuation of the catalyst concentration in the downflow pipe reactor and the backmixing of the catalyst in the zone near the inlet of the downflow pipe, and therefore can decrease coke on the catalyst and improve the yields of products with high value. Besides, when packing is equipped in the catalyst lifting zone, the residence time of the catalyst in the catalyst lifting zone is shortened, so that the reduction in the catalyst activity resulted from the long time contact of the catalyst with the lifting medium (generally it is steam) at a high temperature can be avoided.

Preferably, a coking-preventing steam distributor is equipped near the nozzles of the hydrocarbon oils to prevent the oil/gas from sever coking on the wall of reactor vessel above the inlet of the downflow pipe and raise the reliability of the operation of the FCC units.

Preferably, a guide cone is equipped below reactor top cover and the guide cone is fixedly jointed with the top cover to shorten the residence time of oil/gas in the zone above the inlet of the downflow pipe, alleviate the backmixing of oil/gas, and thereby suppress some harmful reactions such as thermal cracking, over-cracking of the products, etc.

Preferably, an inlet structure of the downflow pipe with reduced and extended diameters is equipped to eliminate the phenomenon of the catalyst flowing down along the side wall of the downflow reaction pipe, and thereby enable the catalyst concentration to distribute more uniformly throughout the cross-section of the downflow reaction pipe, and raise the consistency of the reaction condition in the downflow reaction pipe.

Preferably, multiple regenerated catalyst delivery pipes are equipped symmetrically, thereby can prevent the catalyst from deviated flow in the catalyst lifting zone, make the activity of the catalyst which contacts the feed at the bed surface of the catalyst lifting zone more uniform. Because these delivery pipes can share a single valve for controlling the flow rate of the regenerated catalyst, the adoption of multiple regenerated catalyst delivery pipes in the present invention would not increase the difficulty in controlling the flow rate of the regenerated catalyst.

DETAILED DESCRIPTION OF THE INVENTION

The characters of the structure of the downflow rector provided by the present invention will be further illustrated in combination with the reactor models listed in drawings 1–11, but the present invention is not thus limited in any aspect.

Figure 1:
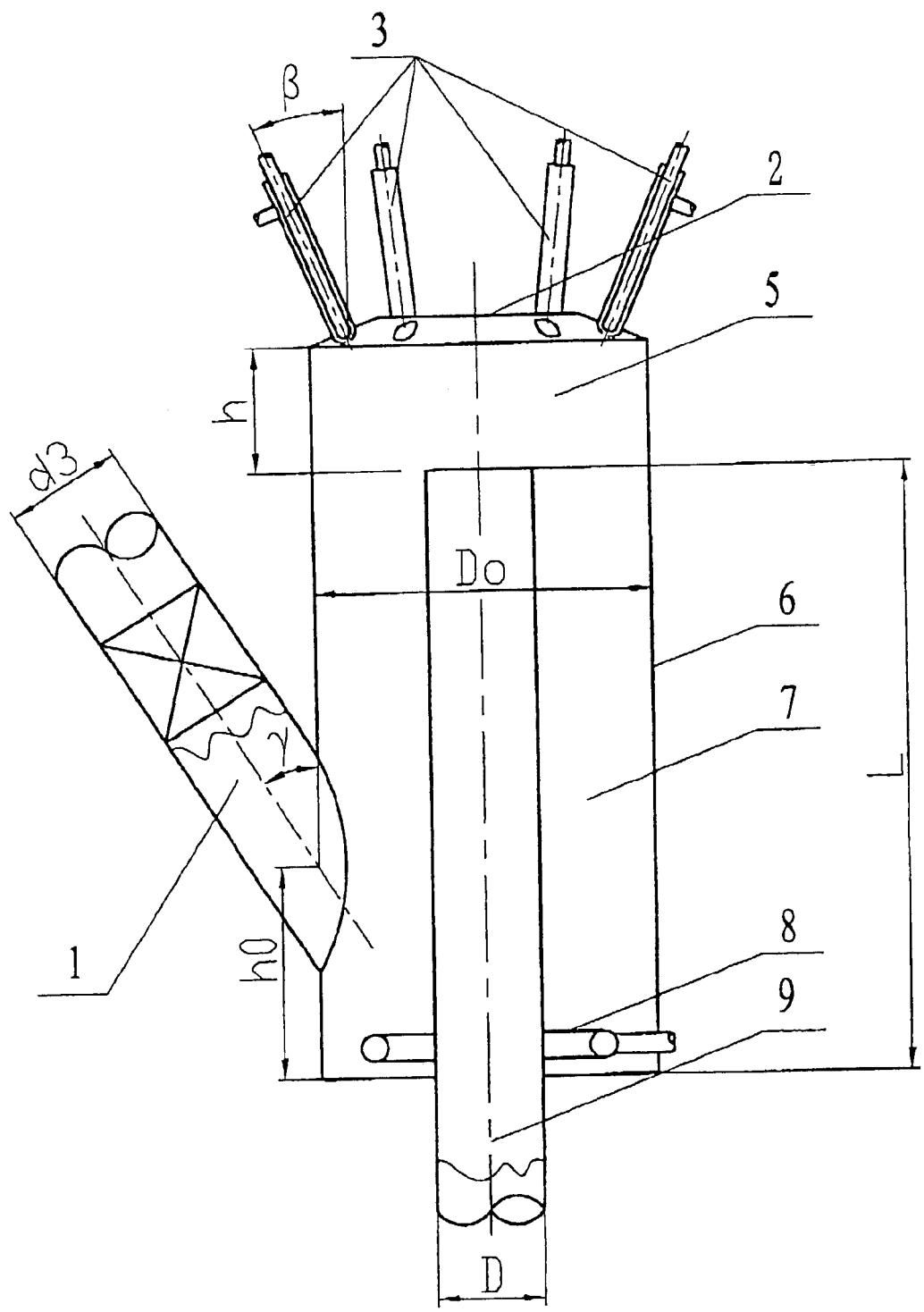
FIGS. 1–11 are the schematic diagrams of the downflow catalytic cracking reactor provided by the present invention.

As shown in FIG. 1, downflow reaction pipe 9 is coaxially installed with reactor vessel 6 along the vertical direction; the upper end of the reactor vessel is close jointed with top cover 2 along the direction of circumference; chamber 5 formed by the zone above the inlet of the downflow reaction pipe in the reactor vessel is used as feed atomization chamber, and the bottom of the reactor vessel is close jointed with the outer wall of the downflow reaction pipe; the upper section of the downflow reaction pipe locates inside the reactor vessel, while the lower section extends from the bottom of the reactor vessel; feed nozzle 3 locates on top cover 2; catalyst delivery pipe 1 is preferably fixedly jointed with the reactor vessel along the direction of radial or tangent and communicated with catalyst lifting zone 7 formed by the reactor vessel and the downflow reaction pipe. The inner diameter of downflow reaction pipe 9 is D and its length is 3–50D, preferably 4–40D. Reactor vessel 6 is coaxially installed with downflow reaction pipe 9 and the diameter of reactor vessel 6 $Do=1.5–6$ D, preferably 2–5D. The present invention has no special requirement on the set-up of the catalyst delivery pipe, which can be designed according to the conventional standard for the catalytic cracking units. For example, the diameter of the catalyst delivery pipe $d3=0.5–1.2D$, the height difference from the cross point of its central line with reactor vessel 6 to the bottom of the reactor vessel $h0=0.5–5D$, and angle between the catalyst delivery pipe and the vertical direction $\gamma$ is not greater than 45°. The present invention has no special requirement on the model of reactor top cover 2, it may be any selected from the group consisting of flanged head, dished head, flanged and dished head, elliptical dished head, torispherical head, elliptical sphere head, flat plate head, hemispherical head, flanged and conical dished head, truncated cone head, flanged and reverse conical head, and inward sunken shell cover. Nozzles 3 can be uniformly and symmetrically distributed on top cover 2 along the direction of circumference and the direct spray of the hydrocarbon oil feed onto the side wall of atomization chamber 5 should be avoided as much as possible. The number of the nozzles is 1–24, preferably 2–20, and most preferably 3–18; the distance from the outlet of the nozzle to the inlet of the downflow pipe h may be 0.3–5D, preferably 0.5–4D, and most preferably 0.6–3D; the angle between the central line of each nozzle and the vertical direction $\beta=0–45°$, preferably $\beta=0–30°$. Height from the inlet of downflow reaction pipe 9 to the bottom of the reactor vessel L may be 2–12D. Preferably, lifting medium distributor 8 locates at the bottom of the aforesaid catalyst lifting zone, it may be selected from the gas distribution plate or gas distribution pipe. If the gas distribution pipe is selected as the lifting medium distributor, it may be one layer or multiple layers, wherein at least one layer locates at the bottom of catalyst lifting zone 7.

Figure 2:
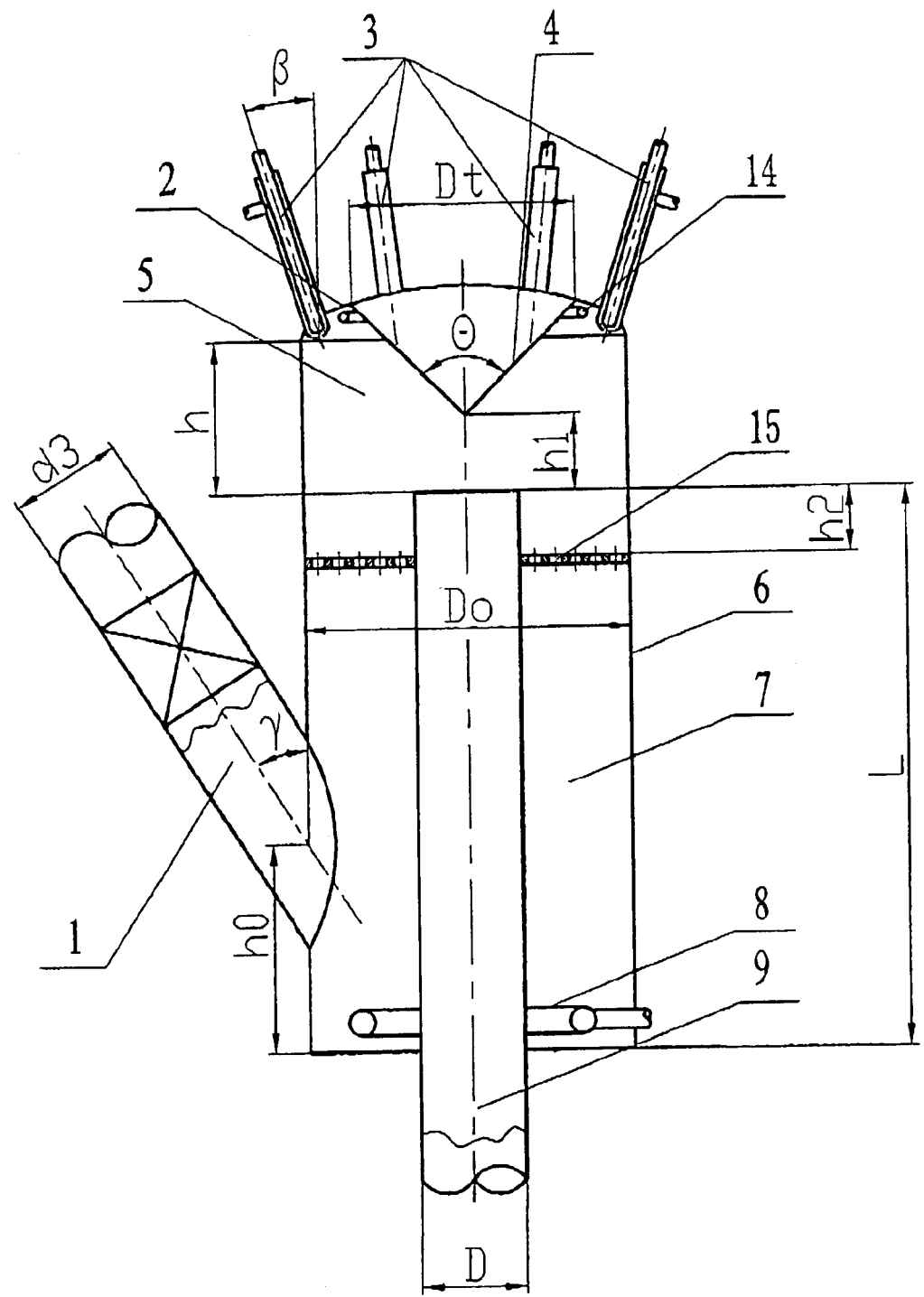

As shown in FIG. 2, the difference between this structure and that in FIG. 1 lies in: guide cone 4 is equipped below reactor top cover 2 and the guide cone is fixedly jointed with top cover 2, it can also be a part of the cover 2 if the cover 2 is a inward sinking shell cover. The bottom diameter of the cone $Dt=1.25–3.5D$, cone angle $\Theta=60–120°$, vertical distance from the cone top to the inlet of the downflow pipe h1 can be determined according to the integral structure of the reactor, the properties of the feed oil, and the desired atomization effect of the feed, e.g. it may be 0.2–1.5D. One or multiple layer orifice plates are equipped in catalyst lifting zone 7 between downflow reaction pipe 9 and reactor vessel 6. The area of all the holes on the orifice plate is 15–50%, preferably 20–40% of the area of the orifice plate; the height difference between the upper face of the orifice plate and the inlet of the downflow reaction pipe h2 may be 0.2–1.5D, preferably 0.5–1D. Besides, coking-preventing steam distributor 14 is preferably equipped under top cover 2 and the setting-up method thereof is the same as that for the coking-preventing steam distributor in the conventional catalytic cracking reactor, e.g. coiled pipe distributors can be used to distribute the coking-preventing steam.

Figure 3:
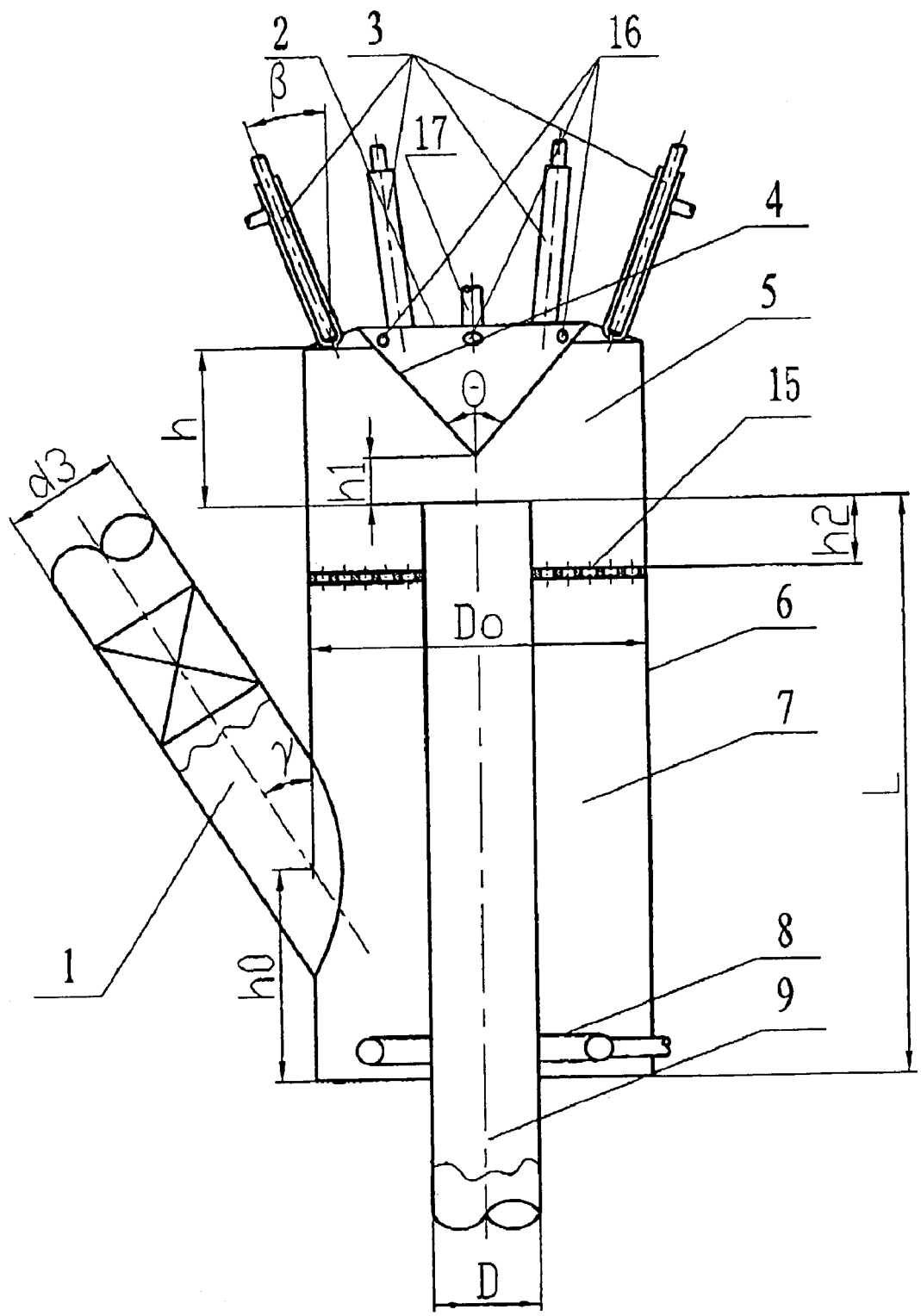

FIG. 3 is another embodiment of the reactor provided by the present invention. The difference between the reactors shown in FIGS. 3 and 1 lies in that coking-preventing steam inlet pipe 17 is equipped on top cover 2; coking-preventing steam nozzle 16 is equipped on the side wall of the upper part of guide cone 4. Besides, orifice plates are also equipped in catalyst lifting zone 7 in this structure.

Figure 4:
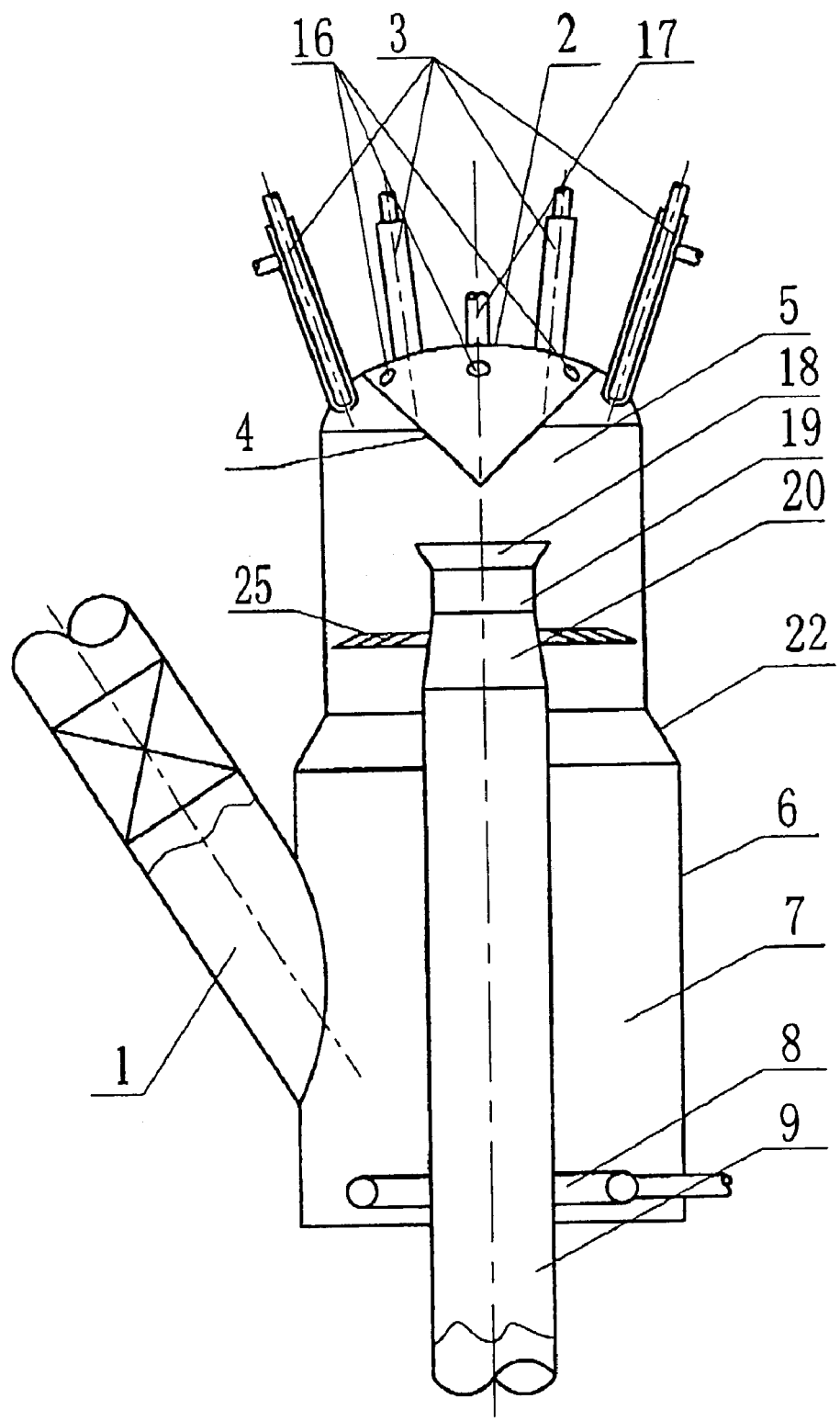
Figure 5:
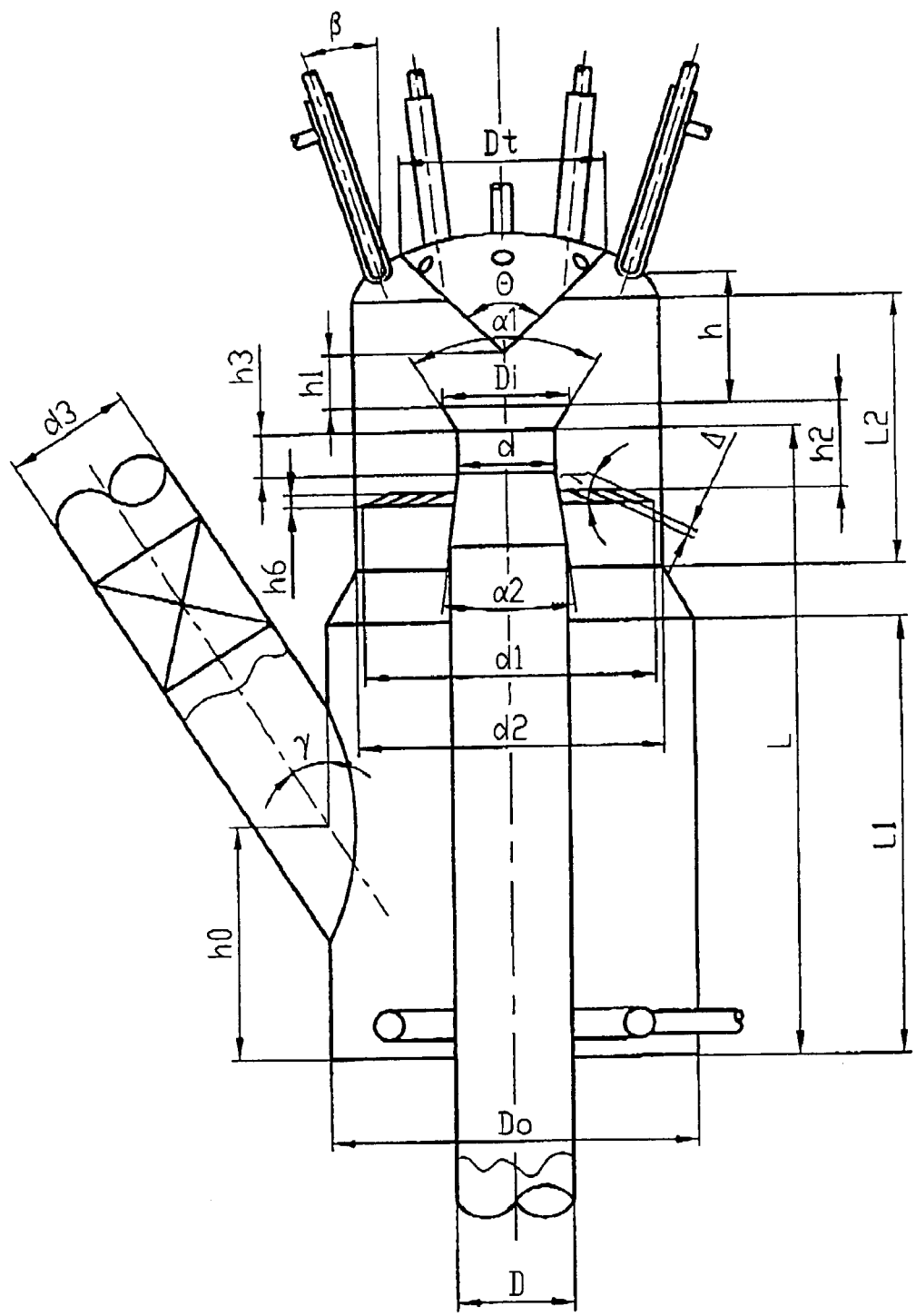

FIGS. 4 and 5 are also the schematic diagrams of the reactors provided by the present invention. As shown in FIGS. 4 and 5, reactor vessel of the reactor may adopt the design of a varied diameter with the upper part being thick and the lower part being thin. Diameter of the lower section of the reactor vessel $Do=2–5D$, length $L1=1.5–8D$. There is diameter reduced section 22 between the upper section and the lower section of the reactor vessel, the diameter of its top rim $d2=1.5–4D$, diameter of the upper section of the reactor vessel $d2=1.5–4D$, and its length $L2=1–4D$. Nozzles 3 are symmetrically installed on the top cover along the direction of circumference and the direct spray of the hydrocarbon oil feed onto the wall of atomization chamber 5 should be avoided as much as possible. Coking-preventing steam inlet 17 is installed on top cover 2. Guide cone 4 is fixedly jointed with top cover 2. The diameter of the bottom of the guide cone $Dt=1.25–3D$, and cone angle $\Theta=60–120°$. Coking-preventing steam nozzle 16 is installed on the side wall of the upper part of the guide cone. The structure of the inlet of the downflow pipe may be a diameter reduced and diameter extended model consisting of diameter reduced section 18, cylinder section 19, and diameter extended section 20. The present invention has no special requirement on the design of this inlet structure as long as the uniformity of the distribution of the oil/catalyst mixture in the downflow reaction pipe is somewhat improved. For example, diameter of the top rim of diameter reduced section 18 $Di=0.9–1.2D$, cone angle $\alpha1=60–120°$; diameter of cylinder section 19 $d=0.6–0.9D$ and length $h3=0.2–0.6D$; cone angle of diameter extended section 20 $\alpha2=30–60°$; height difference between the upper rim of diameter reduced section 18 and the cone top of guide cone 4 $h1=0.2–1.5D$; height difference between the outlet of nozzle 3 and the upper rim of diameter reduced section 18 $h=0.3–5D$. An annular shutter grid can be equipped in catalyst lifting zone 7. For example, height difference between the upper rim of the grid and the upper rim of the diameter reduced section of the downflow pipe inlet structure $h2=0.3–1.2D$ and outer diameter of the grid d1 is 0.02–0.05D smaller than the inner diameter of the upper section of the reactor vessel. The present invention has no special requirement on the design of the grid plate, e.g., angle of each grid to the horizontal direction $\lambda=0–90°$; distance between two adjacent grids $\Delta=0.01–0.05D$; height of the annular grid $h6=0.08–0.4D$. The vertical distance from the upper rim of the inlet reduced section of downflow reaction pipe 18 to the bottom of the reactor vessel is preferably 2–12D.

It should be specially pointed out that catalyst delivery pipe 1 described in the present invention is preferably fixedly jointed with the reactor vessel along the tangent or radial direction of reactor vessel 6 and communicated with catalyst lifting zone 7 formed by the reactor vessel and the downflow reaction pipe. Catalyst delivery pipe 1 can be fixedly jointed with one side of the reactor vessel and communicated with catalyst lifting zone 7 as shown in FIGS. 1–5; it can also be fixedly jointed with two sides of reactor vessel 6 symmetrically as shown in FIGS. 6–10 and communicated with catalyst lifting zone 7 respectively through the two sides of the reactor vessel; it can still be fixedly jointed with multiple sides of reactor vessel symmetrically as shown in FIGS. 6–10 and communicated with catalyst lifting zone 7 respectively through multiple joints of the reactor vessel. Therefore, the number of the catalyst delivery pipe that fixedly jointed with the reactor vessel may be one, two or multiple.

Figure 6:
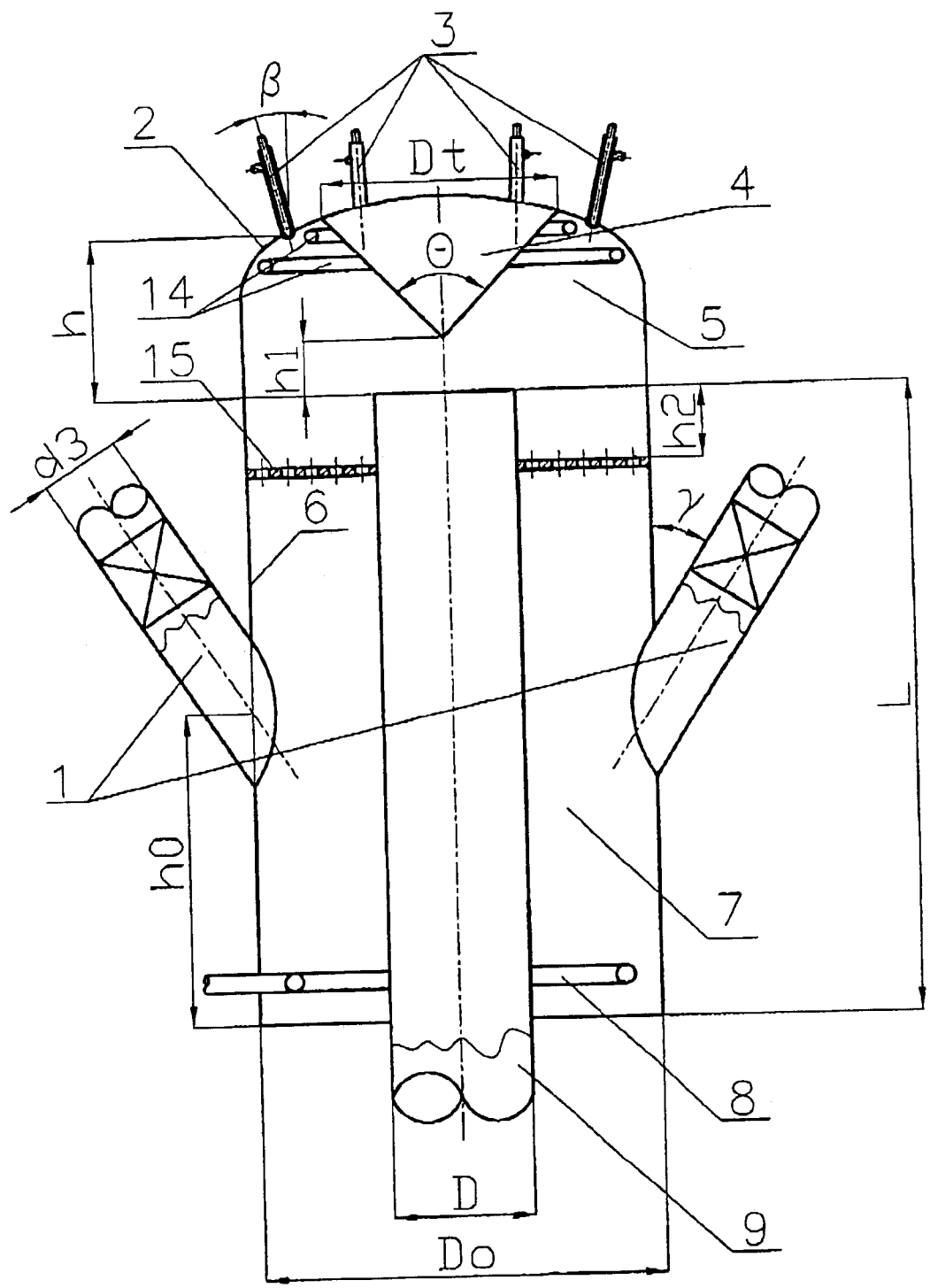

As shown in FIG. 6, catalyst delivery pipe 1 can be fixedly jointed with two sides of the reactor vessel symmetrically and communicated with catalyst lifting zone 7 respectively through the two sides of the reactor vessel; Orifice plate 15 is equipped in catalyst lifting zone 7. Nozzles 3 are uniformly and symmetrically distributed on top cover 2 along the direction of the circumference, and the direct spray of the hydrocarbon oil feedstock onto the wall of atomization chamber 5 should be avoided as much as possible. Coking-preventing steam distributor 14 and guide cone 4 are equipped under top cover 2. Guide cone 4 is fixedly jointed with top cover 2.

Figure 7:
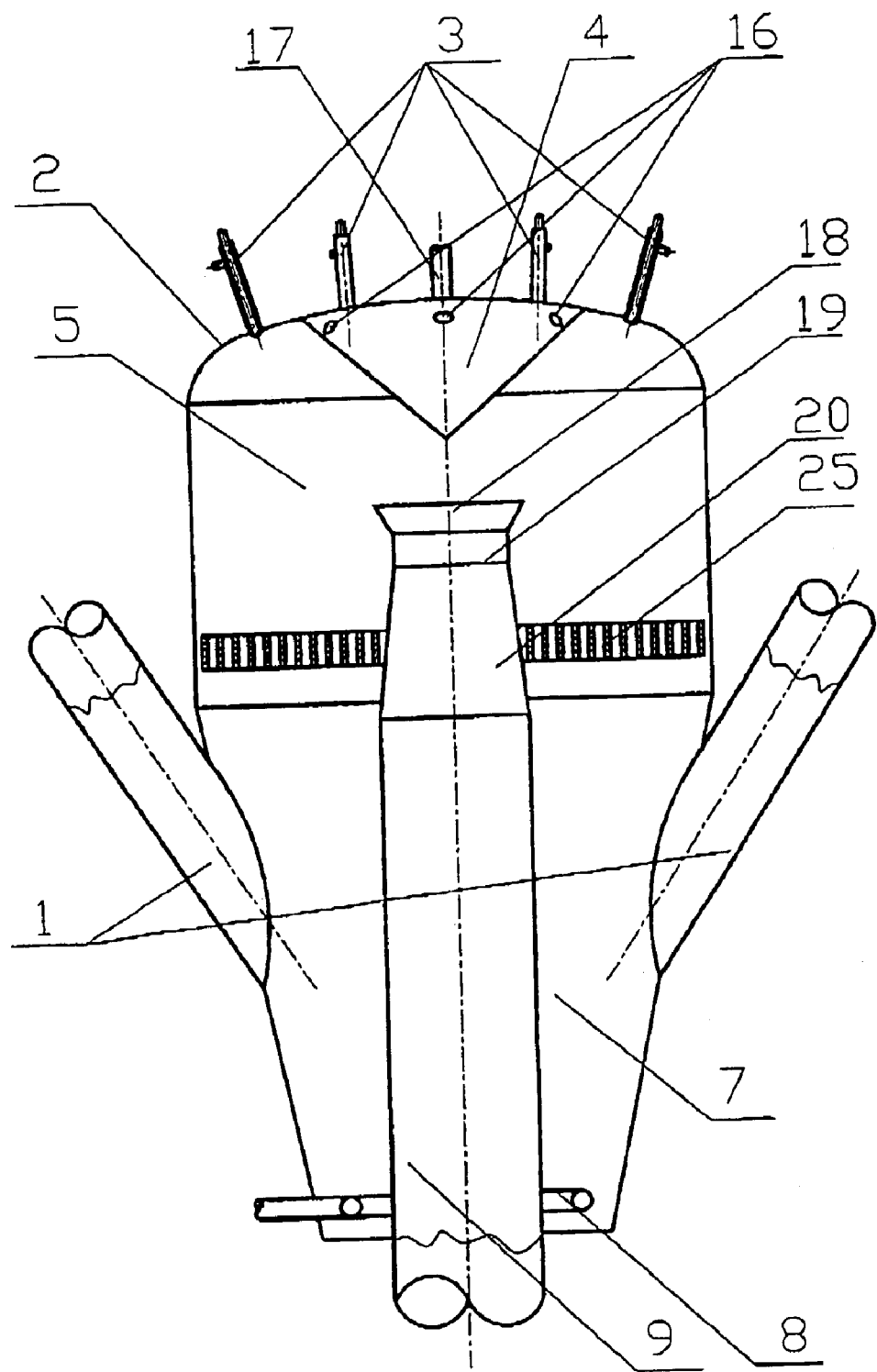
Figure 8:
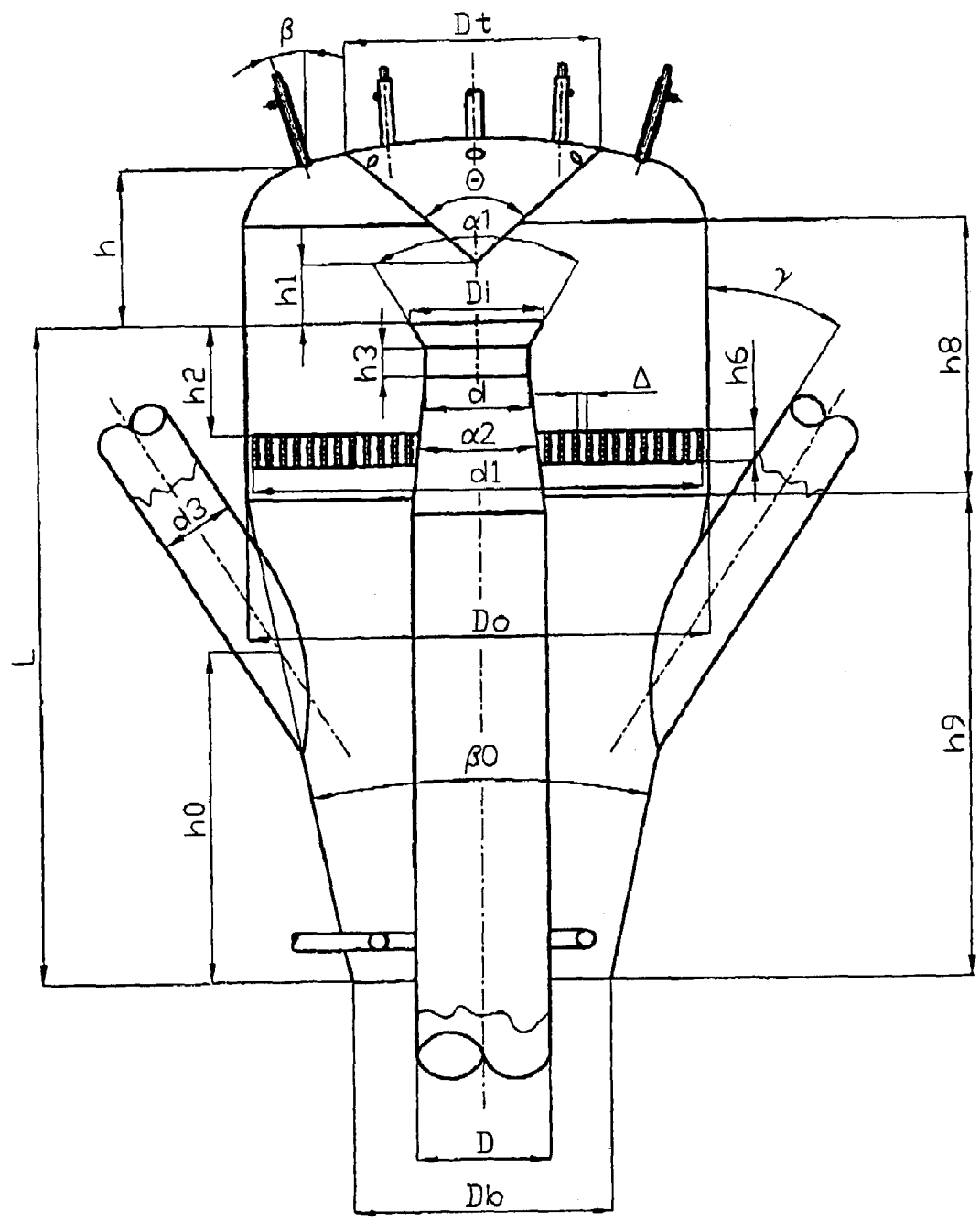

FIGS. 7 and 8 are the schematic diagrams of another embodiment. As shown in FIGS. 7 and 8, the lower section of the reactor vessel can be designed as a cone. Cone angle of the cone β0 is preferably 10–45° and height h9 is preferably 1.5–8D. Diameter of the upper section of the reactor vessel D0=2–5D and height h8=0.5–4D. Nozzles 3 are uniformly and symmetrically equipped on top cover 2 along the direction of the circumference and the direct spray of the hydrocarbon oil feedstock onto the wall of atomization chamber 5 should be avoided as much as possible. Coking-preventing steam inlet pipe 17 is equipped on top cover 2. Top cover 2 is fixedly jointed with guide cone 4. Coking-preventing steam nozzle 16 is equipped on the upper side wall of guide cone 4. The inlet of downflow reaction pipe 9 includes diameter reduced section 18, cylinder 19, and diameter extended section 20. The present invention has no special requirement on the design of the inlet structure as long as the uniformity of the distribution of the oil/catalyst mixture in the downflow reaction pipe can be somewhat improved. Annular shutter grid 25 is equipped in catalyst lifting zone 7. The grid can be composed of coaxial short cylinders or truncated-cones with any cone angle.

Figure 9:
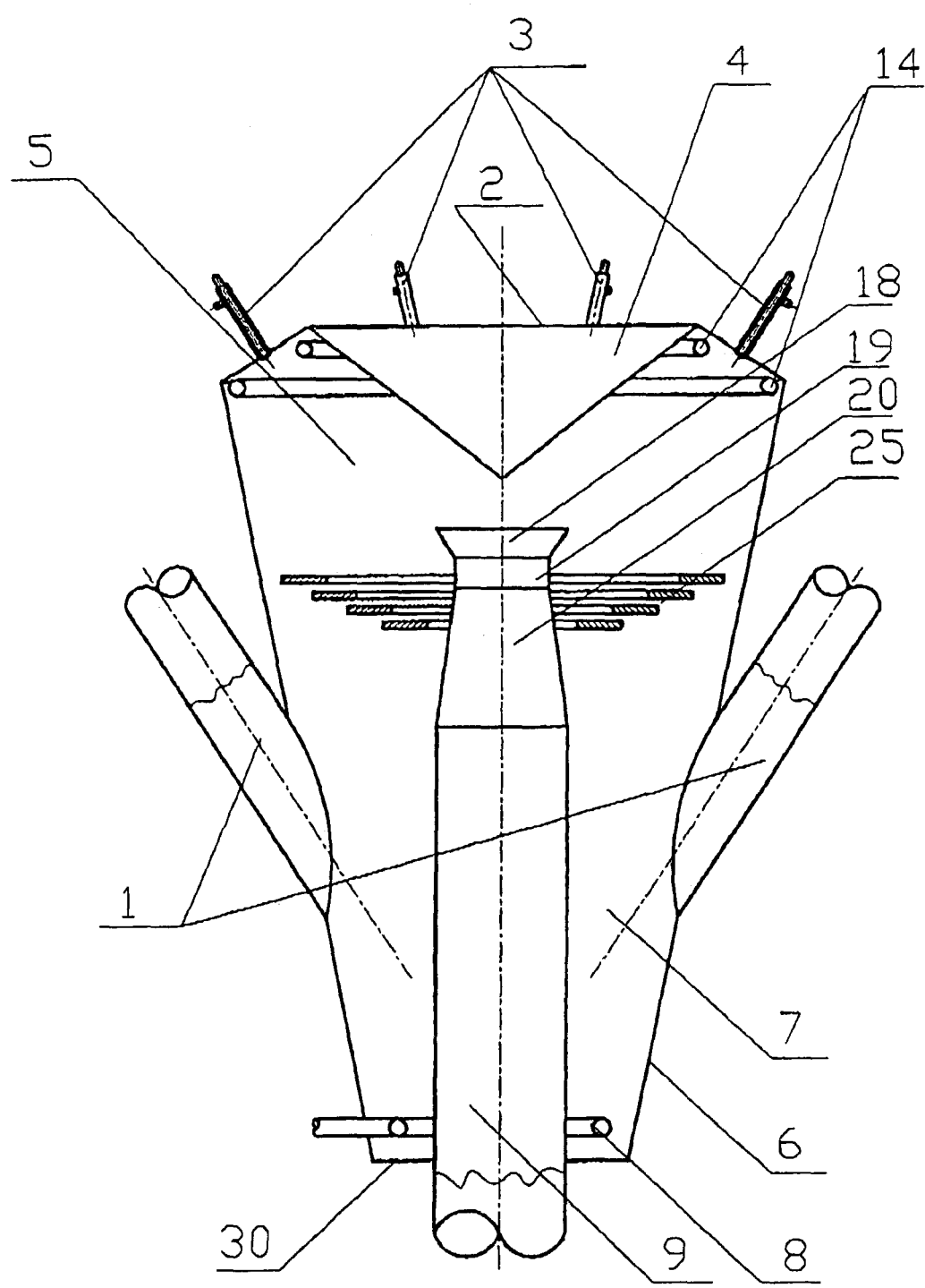
Figure 10:
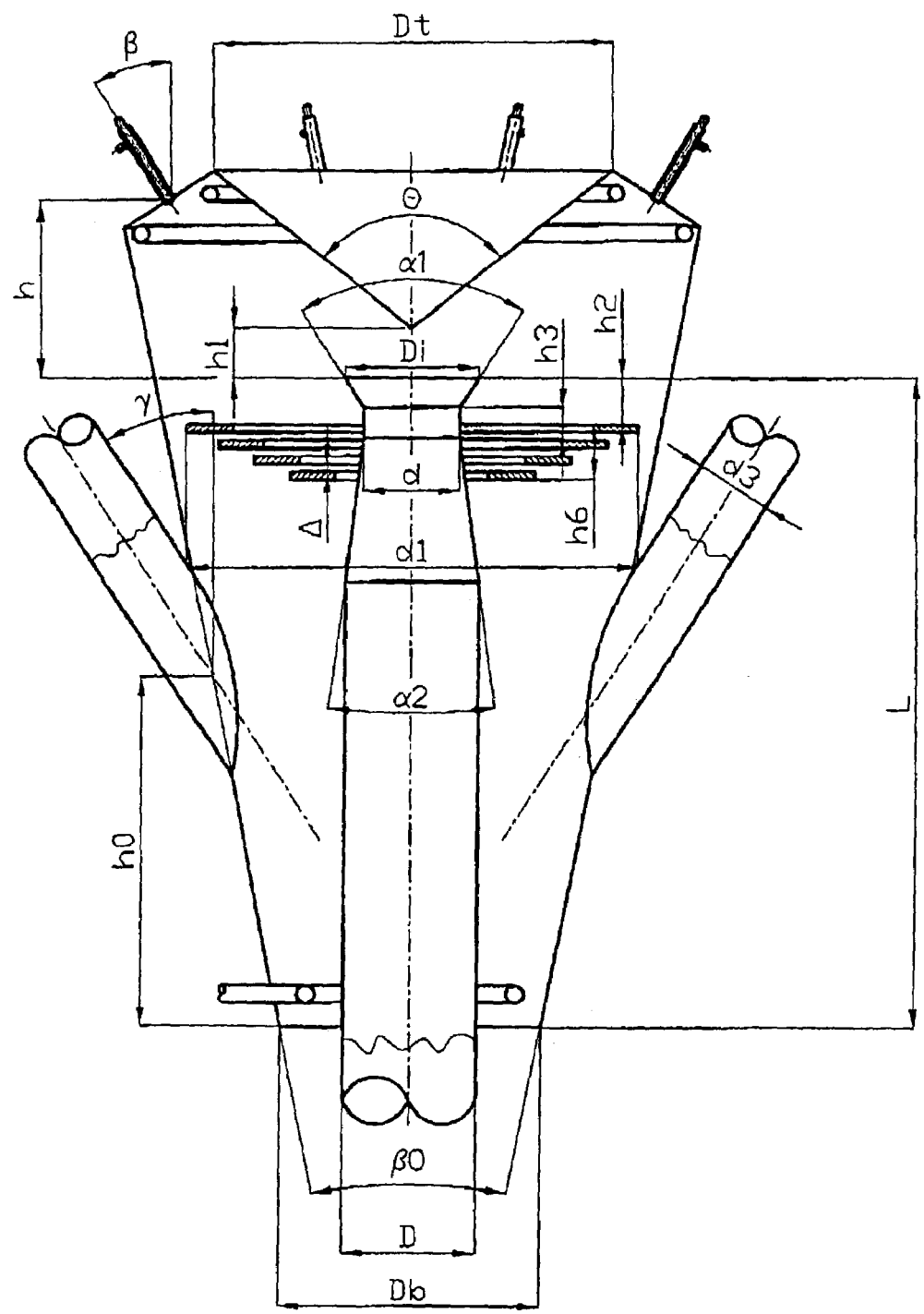

FIGS. 9 and 10 are also the schematic diagrams of the reactor provided by the present invention. As shown in FIGS. 9 and 10, the reactor vessel of the reactor is composed of two truncated-cones, the diameter of the lower truncated-cone's lower rim Db may be 1.25–2.5D, the cone angle of the lower truncated-cone β0 may be 10–45°, the diameter of the upper truncated-cone's upper rim Dt may be 2–4D. Height from the inlet of downflow reaction pipe 9 to the bottom of the reactor vessel L may be 2–12D. Nozzles 3 are uniformly and symmetrically equipped on the sidewall of upper truncated-cone along the direction of the circumference and preferably the central line of nozzle is vertical to the sidewall, the angle between the central line of each nozzle and the vertical direction β=0–60°, preferably β=15–45°, height difference between the outlet of nozzle 3 and the upper rim of diameter reduced section 18 h=0.3–5D, direct spray of the hydrocarbon oil feed onto the wall of atomization chamber 5 should be avoided as much as possible. The Catalyst delivery pipe 1 is symmetrically and fixedly jointed with two sides of the reactor vessel and communicated with catalyst lifting zone 7 through the two sides of the reactor vessel. Top cover 2 is an inward sunken shell cover, it is fixedly jointed with the upper rim of the upper truncated-cone, and the top cover 2 itself also forms a guide cone in the chamber 5. Coking-preventing steam distributor 14 is equipped under the upper truncated-cone of reactor vessel. The inlet structure of downflow reaction pipe 9 includes diameter reduced section 18, cylinder 19, and diameter extended section 20. The present invention has no special requirement on the design of the inlet structure as long as the uniformity of the distribution of the oil/catalyst mixture in the downflow reaction pipe can be somewhat improved. Annular shutter grid 25 is equipped in the upper part of the catalyst lifting zone 7. It can be composed of coaxial annular plates or short truncated-cones with any cone angle.

Figure 11:
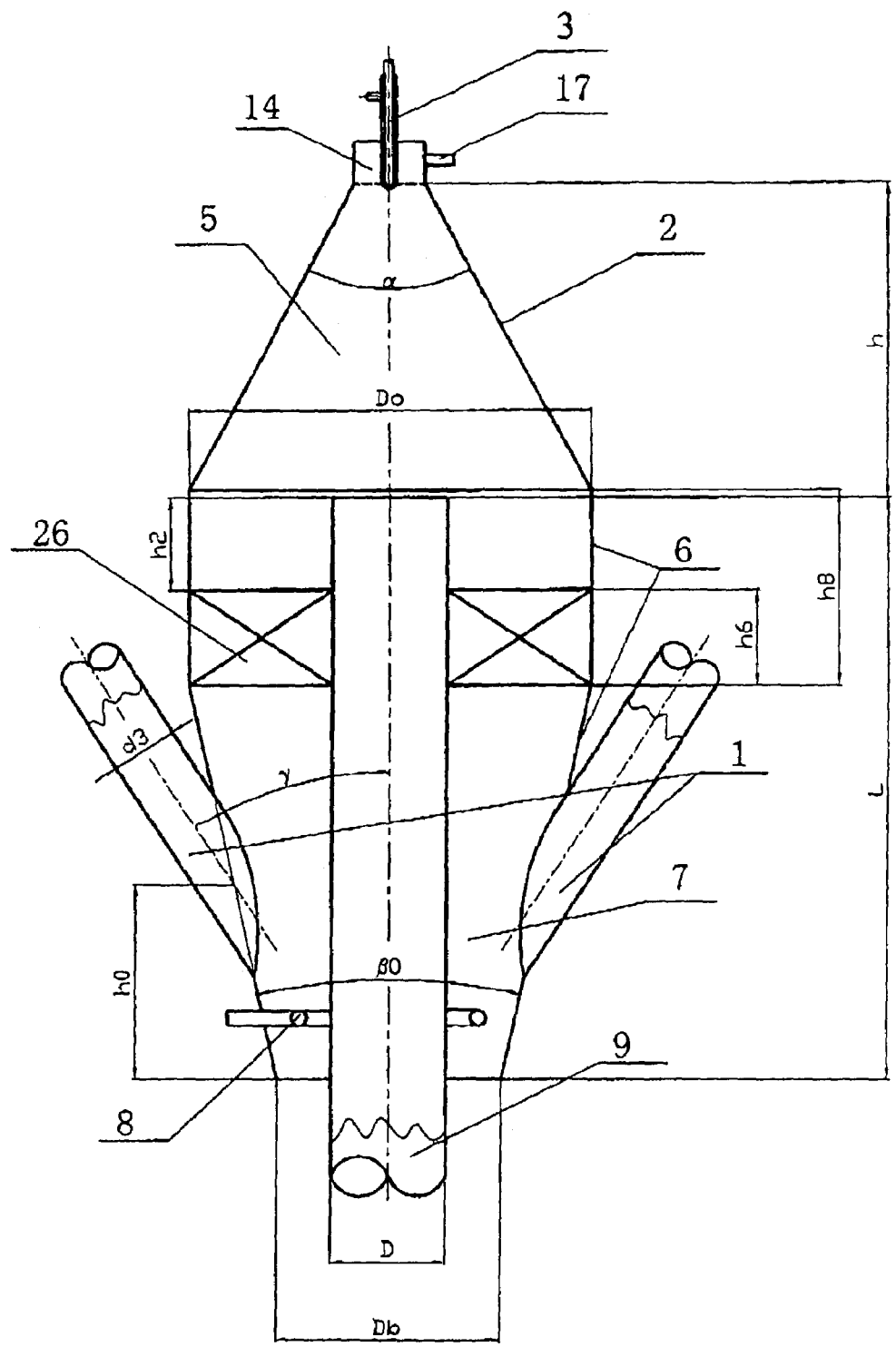
Figure 13:
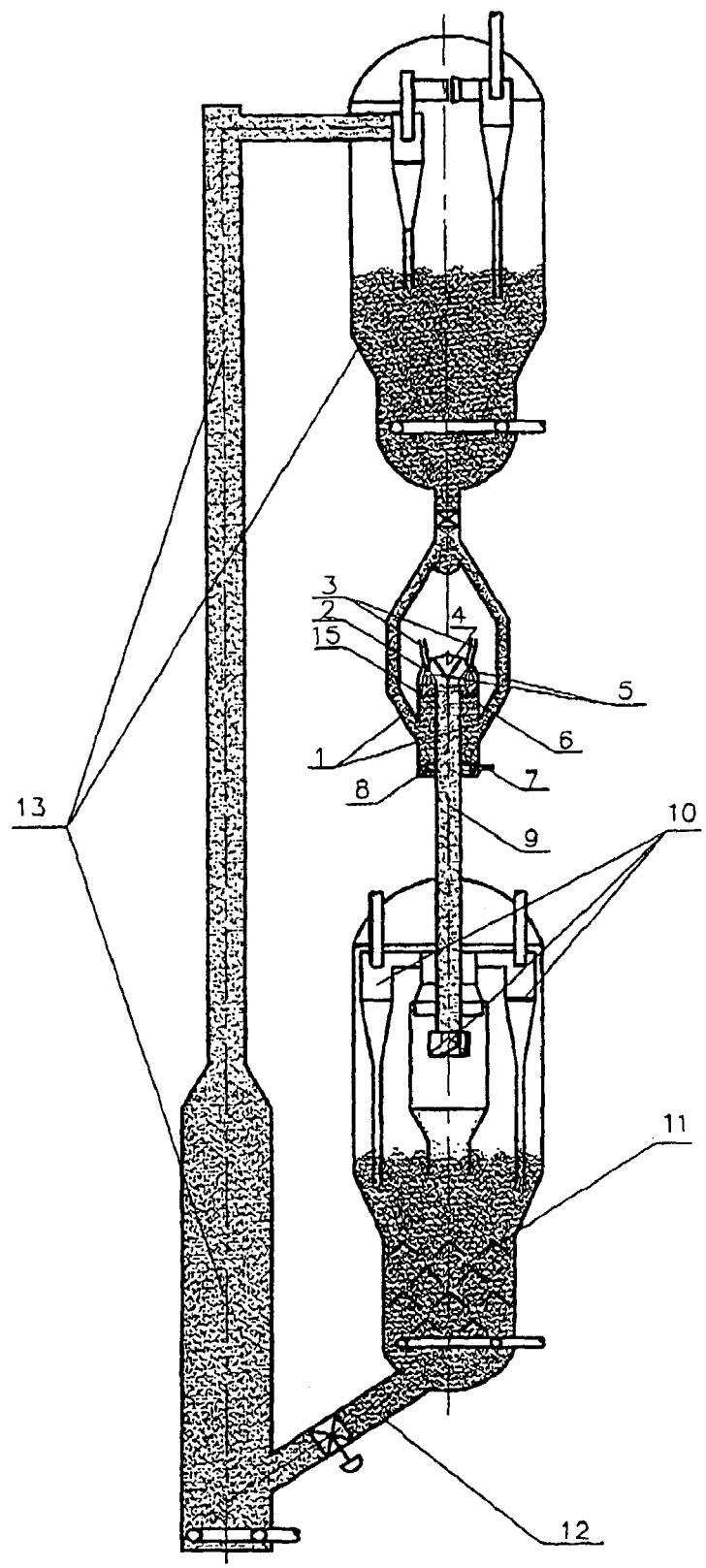

Another embodiment of the present invention is shown in FIG. 11. As it shows, reactor top cover 2 is a truncated-cone and the cone angle had better be 10–90°, preferably 20–75°. Feed nozzles 3 are equipped right above the top cover, and the vertical distance from the lower end of the nozzles to the inlet of the downflow pipe may be 0.3–5D, preferably 0.5–4D, where D is the inner diameter of the downflow reaction pipe. The inner diameter of the downflow reaction pipe may be determined by the amount of the treated feedstock and the adequate value is the one that allows the apparent velocity to be controlled at 3–30 m/s. It is preferable that coking-preventing steam distributor 14 is equipped near feed nozzles 3 to prevent the hydrocarbon oil feed from coking on the inner wall of atomization chamber 5. The present invention has no strict requirement on the form of the coking-preventing steam distributor, e.g., it may introduce the coking-preventing steam into the orifice plate or coil pipe gas distributor through steam pipe 17 and uniformly distribute the coking-preventing steam to the region around the feed nozzles at the top. The present invention can also prevent the formation of big bubbles above the catalyst lifting zone by setting packing zone 26 in this zone as shown in FIG. 11. The present invention has no strict requirement on the height of the packing zone and the type of the packing. Either a regular packing or a random packing can be used but a regular packing is preferred; Vertical height of the packing zone h6 may be 0.1–2 times of the inner diameter of the downflow pipe, preferably 0.2–1.5 times, and most preferably 0.3–1 times. The material for manufacturing the packing should be thermoduric and antiabrasive, such as ceramics, thermoduric alloy steel coated with corundum on the surface, etc. To prevent the packing from being swept away into the downflow pipe or slipping into the lower part of the catalyst lifting zone, it is preferable that orifice plates or grids are set onto the upper face and the lower face of the packing zone to fix the packing. Also, the materials for manufacturing the orifice plate or grids are preferably thermoduric and antiabrasive. Vertical distance from the upper face of the packing zone to the upper end of the downflow pipe h2 may be 0.2–3 times of the inner diameter of the downflow pipe, preferably 0.3–2.5 times, and most preferably 0.5–2 times. Reactor vessel 6 may either be cylinder, or a body with varied diameter as shown in the above Figure, e.g., a body having an upper cylinder and a lower cone as shown in FIG. 11. The vertical height of the reactor vessel 6 is preferably 2–12 times of the inner diameter of the downflow reaction pipe, preferably 2.5–10 times, and most preferably 3–8 times. Said catalyst delivery pipe 1 for delivering the regenerated catalyst to the pre-lifting zone of the reactor may be a single pipe, but preferably is symmetrically divided into two or multiple ways after the slide valve in the main delivery pipe as shown in FIG. 13 to deliver the regenerated catalyst to the catalyst lifting zone so that the velocity distribution of the catalyst throughout the annular cross section of the catalyst lifting zone is more uniform. Regenerated catalyst delivery pipe 1 is fixedly jointed with the reactor vessel along the radial or tangent direction of reactor vessel 6. The total length of downflow pipe 9 may be any value between 3 and 50 times of the inner diameter of the downflow pipe, preferably between 4 and 40 times, and most preferably 5–30 times. Height at which the downflow pipe locates inside the catalyst lifting zone L=2–12D, preferably L=2.5–10D, and most preferably L=3–8D. Pre-lifting medium distributor 8 locates at the bottom of the catalyst lifting zone as shown in FIG. 11. The present invention has no strict requirement on the structure of the distributor and all the pre-lifting medium distributors that are commonly used in this field such as distribution plate, distribution pipe, etc can be used.

The use of the downflow reactor provided by the present invention will further be described below in combination with FIGS. 12 and 13.

Figure 12:
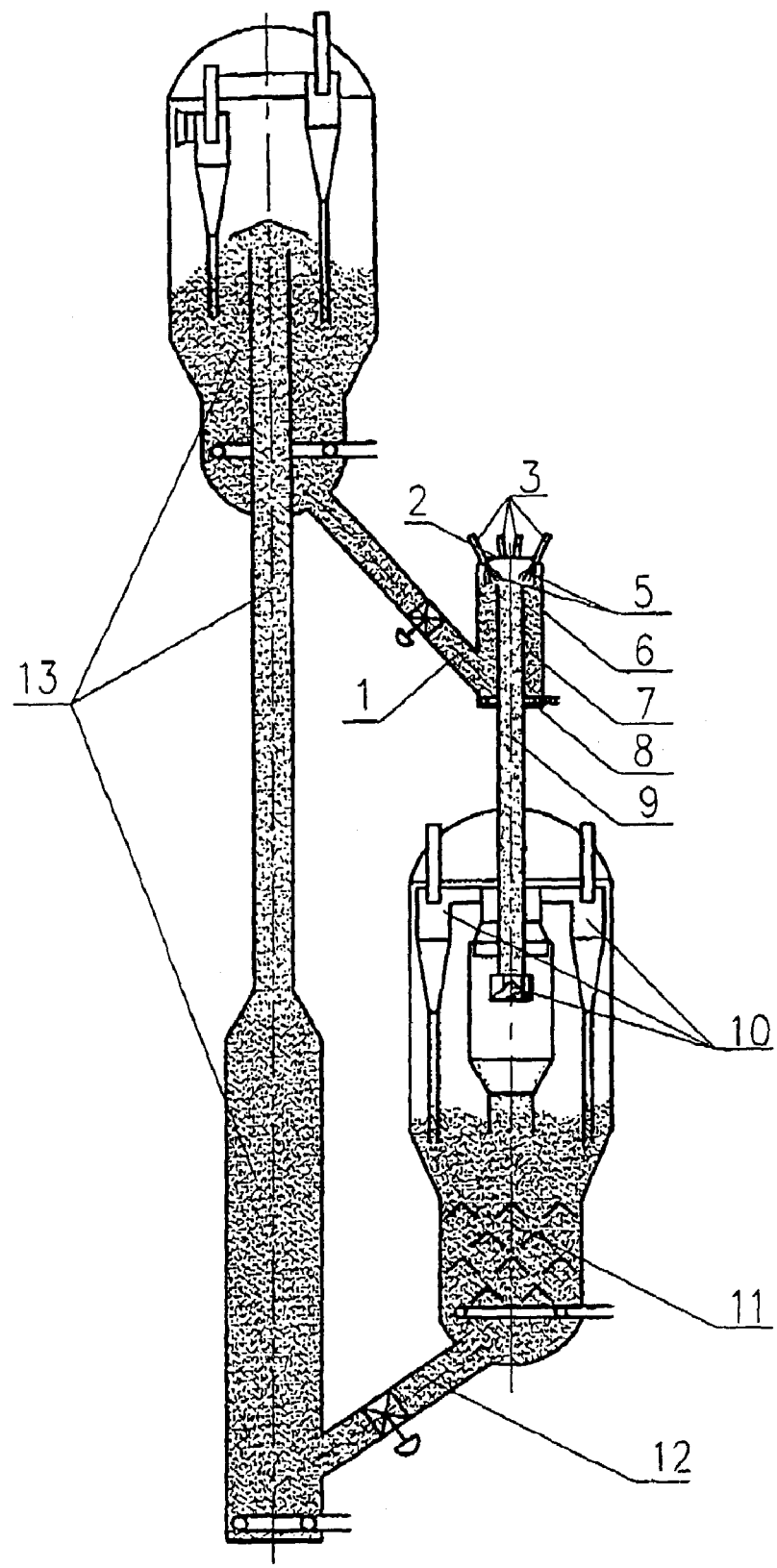
FIGS. 12–13 are the schematic flow diagrams of the reactor provided by the present invention in the reaction-regeneration system of the catalytic cracking units.

As shown in FIG. 12, in the reaction-regeneration system of a catalytic cracking unit, the high temperature regenerated catalyst enters catalyst lifting zone 7 formed by reactor vessel 6 and the upper section of downflow reaction pipe 9 through regenerated catalyst delivery pipe 1. A lifting medium such as steam and/or dry gas, etc enters the annular zone through lifting medium distributor 8, the proper flow rate of which medium is such that the concentration of the catalyst bed in the annular zone is retained at 100–500 kg/m³. The preheated petroleum hydrocarbon is sprayed into feed atomization chamber 5 through feed nozzle 3. Since the concentration of the catalyst in the atomization chamber is extremely low, the atomized fine drops of the petroleum hydrocarbon can penetrate the dilute phase space in the atomization chamber and easily be sprayed onto the catalyst dense phase at the top of catalyst lifting zone 7, contacting the high temperature regenerated catalyst and rapidly vaporizing and reacting. The catalyst that has already contacted the petroleum hydrocarbon congregates towards the inlet of downflow reaction pipe 9 and finally falls into the downflow reaction pipe. Oil/gas and the catalyst fully contact each other in the downflow pipe and continue to react. After preliminary separation of the mixture of the reaction oil/gas and the catalyst through gas-solid rapid separator 10, the catalyst in which a certain amount of coke has accumulated falls into stripper 11, while the producted oil vapour/gas, lifting medium and steam for atomizing are introduced into the subsequent separation system for treatment after removing the entrained catalyst particles. After stripping with steam in the stripper, the used catalyst is introduced into regeneration system 13 through spent catalyst transporting pipe 12 for regeneration by burning coke, and the regenerated catalyst is introduced into the reactor through catalyst delivery pipe 1 for recycle use. Besides, in order to prevent the producted oil vapour/gas from coking on the inner wall of the top cover, the coking-preventing steam is sprayed from the steam coil below reactor top cover 2.

The process flow shown in FIG. 13 differs from that shown in FIG. 12 in that the catalyst from regeneration system 13 symmetrically enters catalyst lifting zone 7 formed by reactor vessel 6 and the upper section of downflow reaction pipe 9 through two-way catalyst delivery pipe 1, and the lifting medium such as steam, and/or dry gas, etc, enters this annular zone through lifting medium distributor 8. The catalyst in the annular zone flows upwards under the action of the lifting gas, and comes into contact with the hydrocarbon feed oil that has been sprayed out from nozzle 3 and fully atomized in feed atomization chamber 5 after penetrating orifice plate 15 in the catalyst lifting zone. The catalyst that has contacted the hydrocarbon oil feed converges towards the inlet of downflow reaction pipe, and finally falls into the downflow reaction pipe. The other part of the process flow is the same as that shown in FIG. 11.

The downflow reactor provided by the present invention and the catalytic cracking and catalytic pyrolysis processes using this reactor have no special requirement on the adopted catalyst, and any catalyst suitable for catalytic cracking field can be used in the present invention. For example, the active component of the catalyst may be one or more selected from the group consisting of Y-type, HY-type, or USY-type zeolite, β-zeolite. ZSM-5-zeolite or other high silica zeolites having a pentasil structure containing or not containing rare earths.

The major operation conditions of the downflow reactor provided by the present invention are as follows: the temperature at the outlet of the downflow pipe reactor is 450–700° C., preferably 480–650° C., and most preferably 490–580° C.; the catalyst/oil ratio is 3–40, preferably 5–35, and most preferably 6–30, the oil/catalyst contact time in the downflow reaction pipe is 0.1–3 s, preferably 0.2–2 s, and most preferably 0.3–1 s.

Besides, the steam for atomizing the feed amounts to 3–30% by weight of the total feeding capacity, preferably 4–25%; the coking-preventing steam injected into the feed atomization chamber amounts to 0–30% by weight of the total feeding capacity, preferably 3–25%; the lifting medium (steam or dry gas) amounts to 2–30% by weight of the total feeding capacity, preferably 3–25%. The reaction pressure (absolute) is 0.05–0.3 MPa, preferably 0.07–0.2 MPa.

The present invention has no special restriction on the property of the feed oil, and any hydrocarbon feedstocks suitable for catalytic cracking process can be the feedstock of this downflow reactor such as atmospheric resid, vacuum resid, vacuum gas oil, deasphalted oil, coker gas oil, hydrogenative end cut oil, gasoline fraction, diesel oil fraction, or mixtures of two or more of above hydrocarbon oils.

The following four examples and comparative examples will further illustrate the present invention but will not exert any restriction on it.

EXAMPLES

Comparative Example

The three comparative examples are the experimental results derived from the experiments with a catalytic cracking pilot plant using the downflow reactor disclosed in U.S. Pat. No. 5,296,131.

The capacity of this pilot plant was 0.24 t/d. The experiment procedure was as follows; after being preheated in a furnace, the feed oil was injected into the upper section of the downflow reactor through the highly efficient atomizing nozzle and brought into contact with the high temperature catalyst from the regenerator to conduct reaction. The oil/gas was rapidly separated from the catalyst after passing through the downflow reactor and introduced into the subsequent separation system through the transfer line for product separation. The spent catalyst after reaction was stripped with steam, and then introduced into the regenerator for regeneration by burning coke, and the regenerated catalyst was fed to the reactor for recycle use. Various products derived in the experiment were metered and analyzed.

The properties of the three feed oils used in the three comparative examples are shown in Table 1. The catalyst used in Comparative Example 1 is produced by the Catalyst Plant of Lanzhou Oil Refinery & Chemical Works with the trade mark of LV-23. The catalysts used in Comparative Examples 2 and 3 are produced by the Catalyst Plant of Qilu Petrochemical Filiale of SINOPEC with trade marks of CRP-1 and CEP respectively, the properties of which are shown in Table 2. The major operation conditions, product distribution, and properties of the major products are shown in Tables 3–5.

Example 1

The present example demonstrates that the product distribution and the properties of the products have been markedly improved by using the downflow reactor provided by the present invention when conducting the catalytic cracking reaction under the conventional catalytic cracking conditions The principle flow diagram of the catalytic cracking pilot plant used in the experiment is shown in FIG. 12 and the schematic diagram of the structure of the downflow reactor is shown in FIG. 1. Diameter of the downflow reaction pipe D=20 mm; diameter of the reactor vessel Do=2.5D; height difference from the inlet of the downflow pipe to the bottom of the reactor vessel L=6D; the number of the nozzles was 4; the angle of each nozzle to the vertical direction $\beta=30°$ and height difference from the outlet of the nozzle to the inlet of the downflow pipe h=1.25D; diameter of the catalyst delivery pipe d3=0.8D, the angle of the central line of the catalyst delivery pipe to the vertical direction $\gamma=30°$, and height difference from the crossing point of the catalyst delivery pipe's central line with the reactor vessel to the bottom of the reactor vessel h0=3D.

The feed oil, catalyst, and experiment procedure are all the same as those in the comparative examples and the major operation conditions, product distribution and the properties of the products are shown in Table 3.

It can be seen from comparing the experimental data of Example 1 and Comparative Example 1 shown in Table 3 that the present invention can markedly raise the ability for converting heavy oils, enabling the yield of LPG+gasoline+LCO in the product to increase by more than 7%, the yield of dry gas to increase by only 0.5%, the yield of coke not to increase, and the research octane number to increase by 1 unit.

Example 2

The present example demonstrates that the distribution and properties of the product have been markedly improved by using the downflow reactor provided by the present invention.

The principle flow diagram of the catalytic cracking pilot plant used in the experiments is shown in FIG. 13 and the schematic diagram of the structure of the downflow reactor is shown in FIG. 10. Diameter of the downflow reaction pipe D=20 mm; cone angle of the reactor vessel $\beta 0=22.5°$, and diameter of the bottom rim of the reactor vessel Db=2D; height difference from the upper rim of the diameter reduced section of the downflow pipe's inlet structure to the bottom of the reactor vessel L=6D; the number of the nozzles was 6; the angle of each nozzle to the vertical direction $\beta=45°$ and height difference from the outlet of the nozzle to the upper rim of the diameter reduced section of the downflow pipe h=1.35D; diameter of the bottom of the guide cone Dt=3D, its cone angle $\Theta=100°$, and height difference from the upper rim of the diameter reduced section of the downflow pipe to the top of the guide cone h1=0.5D; height difference from the upper rim of the shutter annular grid plate to the upper rim of the diameter reduced section of the downflow pipe inlet h2=1.5D. Two catalyst delivery pipes are equipped and diameter of the catalyst delivery pipe d3=0.6D, the angle of the central line of the catalyst delivery pipe to the vertical direction $\gamma=30°$, and height difference from the crossing point of the central line of the catalyst delivery pipe with the reactor vessel to the bottom of the reactor vessel h0=3D.

The feed oil, catalyst, and experiment procedure used in the experiment are all the same as those in the comparative examples and the major operation conditions, product distribution and the properties of the major products are shown in Table 3.

It can be seen from comparing the experimental data of Example 2 and Comparative Example 1 shown in Table 3 that the present invention can markedly raise the ability for converting heavy oils, enabling the yield of LPG+gasoline+LCO in the product to increase by more than 7%, the yield of coke+dry gas not to increase, and the research octane to increase by 1 unit. It is obvious that the present invention can raise the yield of the products with high added value, and simultaneously raise the octane number of gasoline.

Example 3

The present example demonstrates the experimental results derived under rather rigorous conditions by using the downflow reactor provided by the present invention.

The structure of the downflow reactor used in the present example is shown in FIG. 11. Diameter of the downflow reaction pipe D=20 mm; diameter of the lower end of the lower cone section of reactor vessel 6 of the catalyst lifting zone Db=2.5D, diameter of the upper end Do=3.5D, and its height was 3D; height of the upper cylinder h8=2D; height difference from the inlet of the downflow pipe to the bottom of reactor vessel 6 L=5D; height difference from the outlet of nozzle 3 to the inlet of downflow pipe 9 h=1.5D; catalyst delivery pipe 1 was two symmetrically arranged inclined pipes with diameter d3=0.7D, the angle of their central lines to the vertical direction $\gamma=30°$, and height difference from the crossing point of the catalyst delivery pipe's central line with the reactor vessel to the bottom of the reactor vessel h0=2D. Regular packing made from ceramics were equipped in the catalyst lifting zone, and height of the packing zone h6=1D. The feed atomizing steam amounted 15% by weight of the hydrocarbon oil feed and the lifting steam amounted 15% by weight of the hydrocarbon oil feed.

The feed oil, catalyst, and experiment procedure in Example 3 were all the same as those in Comparative Example 2 and the major operation conditions, product distribution and the properties of the major products are shown in Table 4.

It can be seen from Table 4 that, comparing to Comparative Example 2, the heavy oil content in the product of Example 3 was lowered by more than 8%, the yield of light liquid hydrocarbons (LPG+gasoline+LCO) was increased by near 8%, the yield of the dry gas and coke was increased by less than 0.5%. The yield of propylene in the product increased by more than 3%. It is obvious that the downflow reactor provided by the present invention can markedly raise yield of light liquid hydrocarbons and raise the yield of propylene when used to convert hydrocarbon oil feeds under rather rigorous conditions.

Example 4

The present example demonstrates the experimental results derived under highly rigorous conditions by using the downflow reactor provided by the present invention.

The structure of the downflow reactor used in the present example is shown in FIG. 11. Diameter of the downflow reaction pipe D=20 mm; diameter of the lower end of the lower cone section of reactor vessel 6 of the catalyst lifting zone Db=2.5D, diameter of the upper end Do=4D, and the height was 4D; height of the upper cylinder section h8=2D; height difference from the inlet of the downflow pipe to the bottom of reactor vessel 6 L=6D; height difference from the outlet of nozzle 3 to the inlet of downflow pipe 9 H0=1D; catalyst delivery pipe 1 was three symmetrically arranged inclined pipes with diameter d3=0.7D, the angle of their central lines to the vertical direction γ=30°, and height difference from the crossing point of the catalyst delivery pipe's central line with the reactor vessel to the bottom of the reactor vessel h0=2D. The feed atomizing steam amounted 15% by weight of the hydrocarbon oil feed, the injected coking-preventing steam amounted 20% by weight of the hydrocarbon oil feed, and the lifting steam amounted 25% by weight of the hydrocarbon oil feed.

The feed oil, catalyst, and experiment procedure used in Example 4 were all the same as those in Comparative Example 3, and the major operation conditions, product distribution and the properties of the major products are shown in Table 5.

It can be seen from Table 5 that, comparing to comparative example 3, the heavy oil content in example 4 decreased by more than 6 percent, the yield of ethylene increased by near 3 percent, and the yield of propylene increased by near 2.5 percent, while the yield of coke did not increase basically. It is obvious that when the downflow reactor provided by the present invention was used to convert hydrocarbon oil feed, it can markedly increase the conversion of heavy oils and the yield of light olefins under highly rigorous conditions.

The present application claims priority under 35 C.F.R. §119 of Chinese Patent Application No. 02116925.X filed on Apr. 26, 2002, Application No. 03119556.3 filed on Mar. 11, 2003 and Application No. 03119557.1 filed on Mar. 11, 2003. The disclosures of each of the foregoing applications are expressly incorporated by reference herein in their entirety.

TABLE 1

| Feedstock | A | B | C |
|---|---|---|---|
| Density (20° C.)/g.cm$^3$ | 0.9064 | 0.8648 | 0.9012 |
| Conradson Carbon residue/wt. % | 5.09 | 1.29 | 4.8 |
| Element composition/wt % | | | |
| C | 86.50 | 85.65 | 86.53 |
| H | 12.69 | 13.56 | 12.84 |
| Metal content/ppm | | | |
| Ni | 10.8 | 0.48 | 6.3 |
| V | 8.2 | <0.01 | 0.05 |

TABLE 1-continued

| Feedstock | A | B | C |
|---|---|---|---|
| Boiling range/° C. | | | |
| Initial | 236 | 274 | 284 |
| 10 vol. % | 402 | 365 | 388 |
| 30 vol. % | 458 | 407 | 429 |
| 50 vol. % | 510 | 465 | 492 |

TABLE 2

| Physical property | LV-23 | CRP-1 | CEP |
|---|---|---|---|
| Specific surface area, m$^2$/g | 100 | 160 | 152 |
| Pore volume, ml/g | 0.28 | 0.26 | 0.24 |
| Bulk density, g/cm$^3$ | 0.82 | 0.86 | 0.91 |
| Screen separation, wt % | | | |
| 0–40 μm | 11 | 26.0 | 16.6 |
| 40–80 μm | 58 | 60.8 | 42 |
| >80 μm | 31 | 13.2 | 41.4 |

TABLE 3

| Item | Comparative Example 1 | Example 1 | Example 2 |
|---|---|---|---|
| Feedstock | A | A | A |
| Catalyst | LV-23 | LV-23 | LV-23 |
| Major operating condition | | | |
| Reaction Temp, ° C. | 500 | 500 | 500 |
| Reaction pressure (gauge), kPa | 110 | 110 | 110 |
| Feed Temp, ° C. | 200 | 200 | 200 |
| Regeneration Temp, ° C. | 700 | 700 | 700 |
| Catalyst/oil, wt/wt | 8.0 | 8.0 | 8.0 |
| Oil Residence Time, s | 0.68 | 0.65 | 0.65 |
| Yields, wt % | | | |
| Dry gas | 2.90 | 3.45 | 3.24 |
| LPG | 13.69 | 16.14 | 15.17 |
| Gasoline | 38.86 | 39.87 | 39.28 |
| LCO | 25.88 | 29.84 | 31.52 |
| HCO | 10.23 | 2.52 | 2.85 |
| Coke | 7.64 | 7.56 | 7.35 |
| Total yield of light liquid hydrocarbons, wt % | 78.70 | 85.85 | 85.97 |
| Yield of light oil, wt % | 64.74 | 69.71 | 70.80 |
| Properties of major products | | | |
| Density of gasoline, g/cm$^3$ | 0.73 | 0.73 | 0.74 |
| RON of gasoline | 91 | 92 | 92 |
| MON of gasoline | 80 | 81 | 81 |
| Density of LCO, g/cm$^3$ | 0.90 | 0.88 | 0.89 |
| Freezing point of LCO, ° C. | −3 | −7 | −5 |

TABLE 4

| Item | Comparative Example 2 | Example 3 |
|---|---|---|
| Feedstock | B | B |
| Catalyst | CRP-1 | CRP-1 |
| Major operating condition | | |
| Reaction Temp, ° C. | 560 | 560 |
| Reaction pressure (gauge), kPa | 100 | 100 |
| Feed Temp, ° C. | 260 | 260 |
| Regeneration Temp. ° C. | 710 | 690 |
| Catalyst/oil ,wt/wt | 18.6 | 18.1 |
| Oil Residence Time, s | 0.6 | 0.6 |

TABLE 4-continued

| Item | Comparative Example 2 | Example 3 |
|---|---|---|
| Yields, wt % | | |
| Dry gas | 6.77 | 7.16 |
| LPG | 43.13 | 48.70 |
| Gasoline | 22.31 | 23.65 |
| LCO | 11.25 | 12.33 |
| HCO | 9.70 | 1.02 |
| Coke | 6.11 | 6.43 |
| Wherein yield of light olefins, wt % | | |
| Ethylene | 3.28 | 3.45 |
| Propylene | 20.67 | 24.15 |
| Properties of major products | | |
| Density of gasoline, g/cm$^3$ | 0.75 | 0.75 |
| RON of gasoline | 96 | 95 |
| MON of gasoline | 82 | 81 |
| Density of LCO, g/cm$^3$ | 0.88 | 0.93 |
| Freezing point of LCO, ° C. | −8 | −17 |

TABLE 5

| Item | Comparative Example 3 | Example 4 |
|---|---|---|
| Feedstock | C | C |
| Catalyst | CEP | CEP |
| Major operation condition | | |
| Reaction temperature, ° C. | 650 | 650 |
| Reaction pressure (gauge), kPa | 100 | 100 |
| Preheating temperature of the feed, ° C. | 320 | 320 |
| Temperature of regenerated catalyst, ° C. | 745 | 742 |
| Catalyst/oil, wt/wt | 23.2 | 22.4 |
| Oil Residence Time, s | 0.8 | 0.8 |
| uz,3/9 Yields, wt % | | |
| H$_2$–C$_2$ | 28.76 | 33.25 |
| C$_3$–C$_4$ | 29.17 | 32.61 |
| C$_5^+$ cracked naphtha | 18.24 | 16.53 |
| LCO | 7.13 | 6.87 |
| HCO | 6.64 | 0.53 |
| Coke | 9.25 | 9.36 |
| Wherein yield of light olefins, wt % | | |
| Ethylene | 15.73 | 18.57 |
| Propylene | 18.43 | 20.85 |
| Properties of major products | | |
| Density of naphtha, g/cm$^3$ | 0.81 | 0.82 |
| RON of naphtha | 97 | 99 |
| MON of naphtha | 84 | 85 |
| Density of LCO, g/cm$^3$ | 0.90 | 0.97 |
| Freezing point of LCO, ° C. | −12 | −23 |

We claim:

1. A downflow catalytic cracking reactor, comprising the following components: a catalyst delivery pipe (1), a reactor top cover (2), a feed nozzle (3), a reactor vessel (6), a downflow reaction pipe (9), the upper end of the reactor vessel is close connected to the top cover (2) along the direction of circumference; the bottom of the reactor is close connected to the outer wall of the downflow reaction pipe; the upper section of the downflow reaction pipe is located inside the reactor vessel, the lower section of the downflow reaction pipe extends from the bottom of the reactor vessel; feed nozzle (3) is located on the top cover and/or side wall of the reactor vessel (6), the outlet of the feed nozzle being above the inlet of the downflow reaction pipe; a catalyst delivery pipe (1) is fixedly joined to the reaction vessel and is in communication with a catalyst lifting zone (7) formed by the reactor vessel and the downflow reaction pipe.

2. The reactor according to claim 1, wherein the distance from the outlet of the nozzle to the inlet of the downflow pipe h is equal to or greater than 0.3D.

3. The reactor according to claim 1, wherein a guide cone (4) is provided below said reactor top cover (2) and the guide cone is fixedly joined to the top cover.

4. The reactor according to claim 1, wherein said catalyst delivery pipe is fixedly joined to the reactor vessel along the radial or tangential direction of the reactor vessel.

5. The reactor according to claim 3, comprising at least two catalyst delivery pipes are fixedly joined to the reactor vessel.

6. The reactor according to claim 1, wherein said reactor vessel is a cylinder.

7. The reactor according to claim 1, wherein said reactor vessel has a varying diameter.

8. The reactor according to claim 6, wherein the diameter of the lower section of said reactor vessel is larger than that of the upper section.

9. The reactor according to claim 6, wherein the diameter of the lower section of said reactor vessel is smaller than that of the upper section.

10. The reactor according to claim 8, wherein said reactor vessel is a cone, the diameter of its lower section being smaller than that of its section.

11. The reactor according to claim 1, wherein the inlet of said downward reaction pipe (9) includes a diameter reduced section, a cylinder, and a diameter extended section.

12. The reactor according to claim 3, wherein a coking-preventing steam distributor (14) is provided under said reactor top cover (2); or a steam nozzle (16) in communication with a coking-preventing steam inlet pipe is provided on the side wall of said guide cone (4).

13. The reactor according to claim 1, comprising a catalyst lifting zone (7) formed between the reactor vessel and the downward reaction pipe.

14. The reactor according to claim 13, wherein one orifice plate, grid plate, or packing layers are provided in the upper part of said catalyst lifting zone.

15. The reactor according to claim 1, wherein said reactor top cover (2) is selected from the group consisting of a flanged head, a dished head, a flanged and dished head, an elliptical dished head, a torispherical head, an elliptical spherical head, a flat plate head, a hemispherical head, a flanged and conical dished head, a truncated cone head, a flanged and reverse conical head and an inward sunken shell cover.

16. The reactor according to claim 1, comprising up to 23 additional feed nozzles and the distance from the outlet of the nozzle to the inlet of the downflow reaction pipe h is in the range of from 0.3D to 5D.

17. The reactor according to is claim 16, comprising 2–20 feed nozzles and the distance from the outlet of the nozzle to the inlet of the downflow reaction pipe h is in the range of from 0.5D to 4D.

18. The reaction according to claim 13, comprising a lifting medium distributor (8) disposed at the bottom of said catalyst lifting zone.

19. The reactor according to claim 1, wherein said downflow reaction pipe (9) and said reactor vessel (6) are coaxially disposed along the vertical direction.

* * * * *